United States Patent [19]

De Cosmo et al.

[11] 4,395,195
[45] Jul. 26, 1983

[54] SHROUD RING FOR USE IN A GAS TURBINE ENGINE

[75] Inventors: Anthony R. De Cosmo, Wallingford; John H. Young, South Windsor, both of Conn.

[73] Assignee: United Technologies Corporation, Hartford, Conn.

[21] Appl. No.: 150,489

[22] Filed: May 16, 1980

[51] Int. Cl.³ .............................................. F01D 25/26
[52] U.S. Cl. ..................................... 415/137; 415/138
[58] Field of Search ............... 415/134, 136, 137, 138, 415/139, 170 R, 172 R

[56] References Cited

U.S. PATENT DOCUMENTS

| 2,772,069 | 11/1956 | Hockert et al. | 415/134 |
| 2,809,803 | 10/1957 | Featonby | 415/134 |
| 3,018,085 | 1/1962 | Welsh | 415/136 |
| 3,859,785 | 1/1975 | Leto et al. | 60/39.33 |
| 3,966,352 | 6/1976 | White et al. | 415/115 |

OTHER PUBLICATIONS

Pratt & Whitney Aircraft, "The Aircraft Gas Turbine Engine and Its Operation", Aug. 1970, p. 36.

Primary Examiner—Louis J. Casaregola
Assistant Examiner—Jeffrey A. Simenauer
Attorney, Agent, or Firm—Gene D. Fleischhauer

[57] ABSTRACT

A shroud ring (22) for a gas turbine engine having a stator structure (14) and an array of inwardly extending stator vanes (20) is disclosed. The shroud ring is circumferentially segmented to accommodate inward and outward movement of the vanes and the stator structure. The shroud ring has a segmented outer ring (28) and a segmented inner ring (30). The outer ring engages the vanes to support the vanes and to position the inner ring and an integral seal member (24) about a rotor structure. In one embodiment the vanes (20) are rotatable about a spanwise axis S. In a second embodiment, the vanes (120) are integrally attached to the shroud ring (122).

13 Claims, 3 Drawing Figures

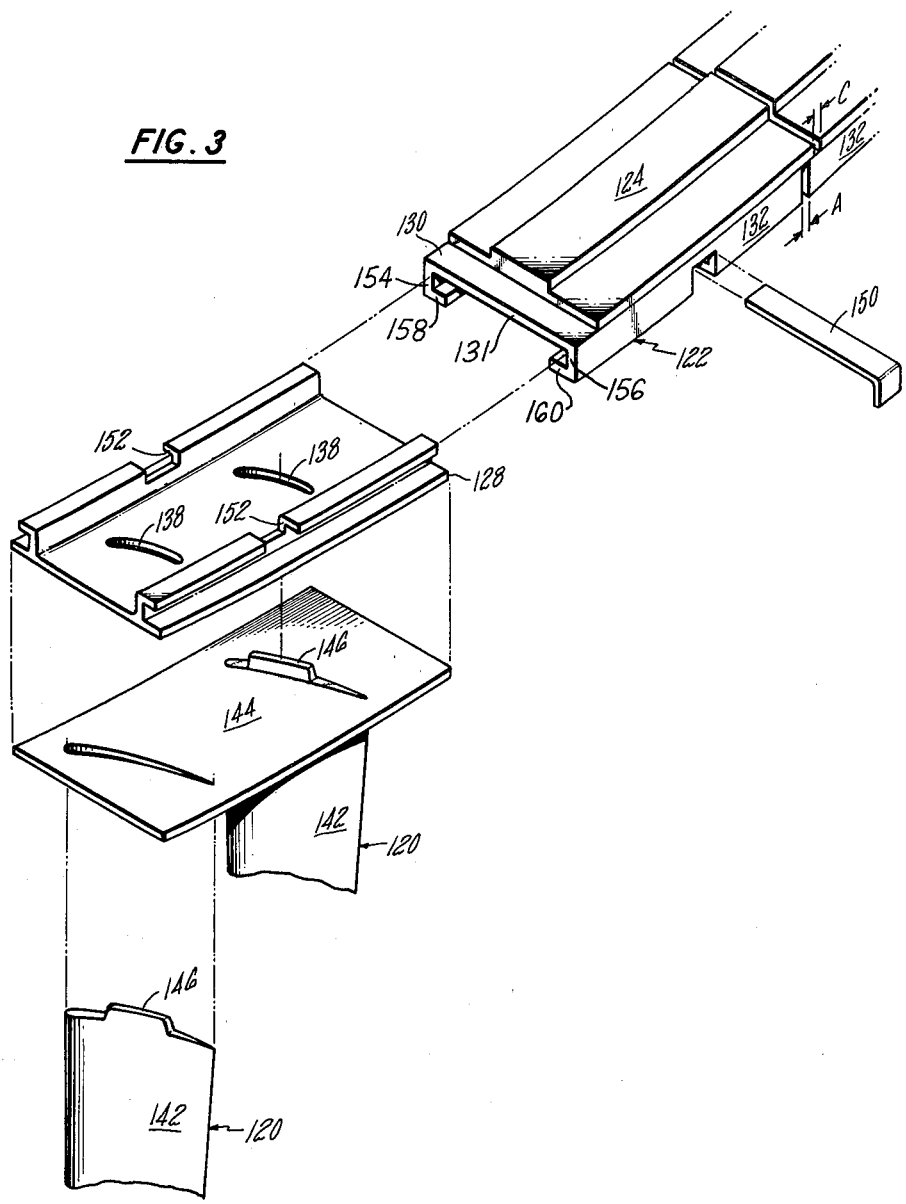

SHROUD RING FOR USE IN A GAS TURBINE ENGINE

The Government has rights in this invention pursuant to Contract No. NAS3-20646 awarded by the National Aeronautics and Space Administration.

DESCRIPTION

1. Technical Field

This invention relates to gas turbine engines, and more particularly to a shroud ring engaging an array of stator vanes in the compression section of such an engine.

2. Background Art

In the compression section of a gas turbine engine, a rotor structure extends axially through the section. A stator structure is spaced radially from the rotor structure and circumbscribes the rotor structure. A flow path for working medium gases extends axially through the compression section between the rotor structure and the stator structure. Arrays of stator vanes are interdigitated with arrays of rotor blades. The rotor blades extend outwardly from the rotor structure into proximity with the stator structure. Arrays of stator vanes extend inwardly from the stator structure into proximity with the rotor structure. An example of such a construction is shown in U.S. Pat. No. 3,859,785 entitled "Turbine Engine with Integral Compressor and Alternator Rotor" issued to Leto et al. In this construction, the stator vanes are cantilevered from the outward stator structure.

In modern engines the inward tips of stator vanes often are connected by a circumferentially continuous shroud ring. The shroud ring extends between the ends of the stator vanes to support the vanes in guided cantilever fashion and to block the leakage of working medium past the inward ends of the vanes of the array. The shroud ring also supports a seal member in close proximity to the rotor structure. An example of such a shroud ring is shown on page 36 of *The Aircraft Gas Turbine Engine and Its Operation,* prepared by Pratt & Whitney Aircraft Group, a division of United Technologies Corporation. In order to accommodate the shroud ring, a cavity must exist between adjacent rows of rotor blades. Such a cavity has an associated aerodynamic penalty. It is, therefore, desirable to reduce the radial profile of the shroud ring in order to reduce the depth of the cavity and its associated aerodynamic detriment.

It is also known to use cantilevered stator vanes having a variable angle of attack with respect to the oncoming working medium gases. Such vanes are rotatable about the spanwise axis of the airfoil of the vane. An example of such a construction is shown in U.S. Patent No. 3,966,352 entitled "Variable Area Turbine" issued to White et al. Providing a shroud ring which permits rotation of the vane is complicated by the desire to minimize the radial profile of the shroud ring.

Accordingly, scientists and engineers are seeking to develop a shroud ring for an array of stator vanes which supports the vanes, positions a seal about a rotor structure, and has an acceptable radial profile.

DISCLOSURE OF INVENTION

According to the present invention, the tips of cantilevered stator vanes are supported at the inward end of each vane by a segmented shroud ring, free acting in the radial direction to position a circumferentially extending seal member radially about a rotor.

In accordance with one embodiment, each vane is spanwisely rotatable and rotatably engages the segmented shroud ring.

A primary feature of the invention is a segmented shroud ring. The shroud ring has a segmented outer ring and a segmented inner ring. The segmented inner ring has a seal surface. Each segment of the outer ring engages the inward end of at least two vanes. Another feature is a plate at each vane. The plate at a corresponding vane is integrally joined to the airfoil of the corresponding vane. A tab extends inwardly beyond the plate. In one embodiment the tab is integrally joined to the segmented outer ring. In another embodiment the plate and tab are cylindrical and rotatably engage the segmented outer ring.

A principal advantage of the present invention is the increased engine efficiency which results from blocking with a shroud ring the leakage of working medium gases past the inward ends of the vanes of an array. The fatigue life of the array of stator vanes is increased by the guided cantilever support of the inward end of each vane by the shroud ring. The efficiency of the engine is increased by the close correspondence between the rotor and the seal member enabled by the free acting radial inward and outward movement of the shroud. Another advantage is the improved aerodynamic efficiency which results from the reduced radial depth of the cavity for the nested shroud ring as compared with cavities for shroud ring constructions not having such a reduced radial profile.

The foregoing and other objects, features and advantages of the present invention will become more apparent in the light of the following detailed description of exemplary embodiments thereof, as shown in the accompanying drawings.

BRIEF DESCRIPTION OF DRAWINGS

FIG. 3 is an exploded perspective view corresponding to the FIG. 2 view which shows an alternate embodiment having stator vanes which are not rotatable.

BEST MODE FOR CARRYING OUT THE INVENTION

Figure 1:
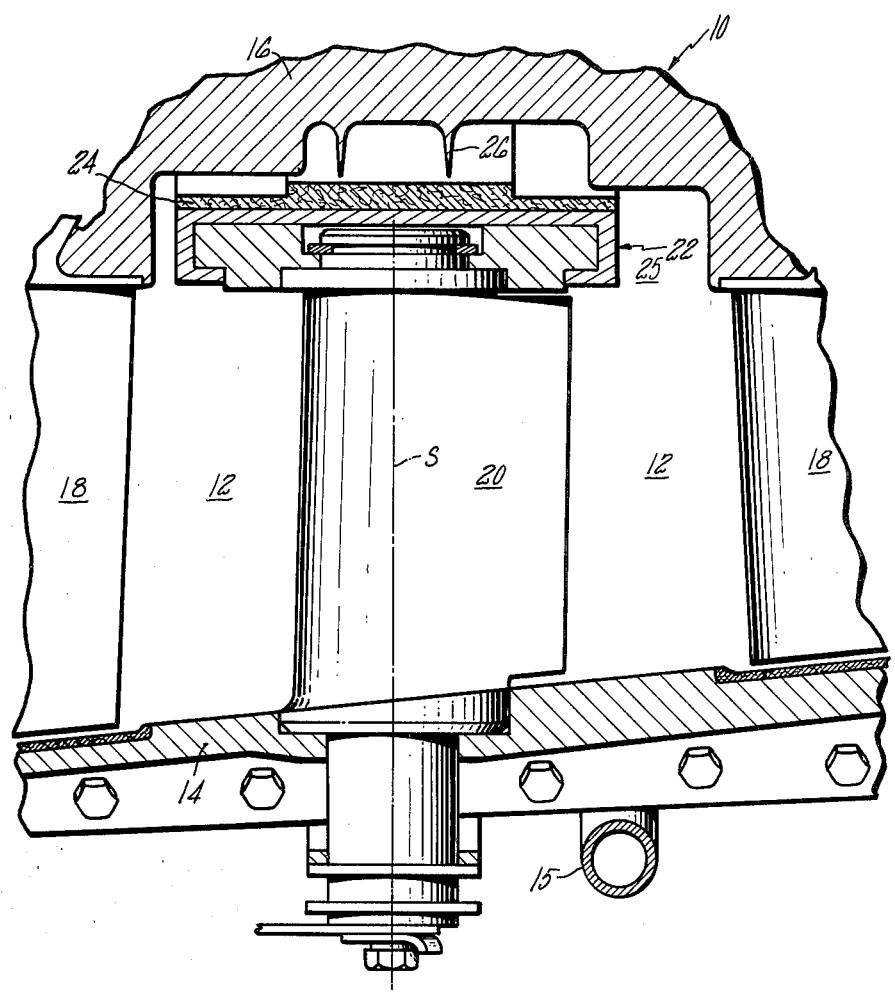
FIG. 1 is a simplified cross section view of a portion of the compression section of a gas turbine engine showing a stator structure, an array of stator vanes and a shroud ring which engages the inward tip of each stator vane.

A gas turbine engine embodiment of the invention is illustrated in the FIG. 1 view. A portion of a compression section 10 of the engine is shown. A flow path 12 for working medium gases extends axially through the compression section. A portion of the stator structure 14 outwardly of the flow path for working medium gases circumscribes the rotor structure 16. Cooling air tubes, such as the single tube 15 shown, circumscribe the stator structure. Arrays of rotor blades 18 extend outwardly on the rotor structure across the flow path for working medium gases and into proximity with the outward stator structure. An array of stator vanes 20 extends inwardly across the flow path from the outward stator structure into proximity with the inward rotor structure. Each vane is rotatable about a spanwise axis S. A shroud ring 22 engages the inward end of each vane of the array of stator vanes. The shroud ring extends circumferentially and is spaced radially from the rotor structure. The shroud ring has a seal member 24 extending inwardly therefrom. The rotor structure has a cavity 25 into which the seal member extends and a plurality of knife edges 26 extending outwardly in opposing relationship with the seal member.

Figure 2:
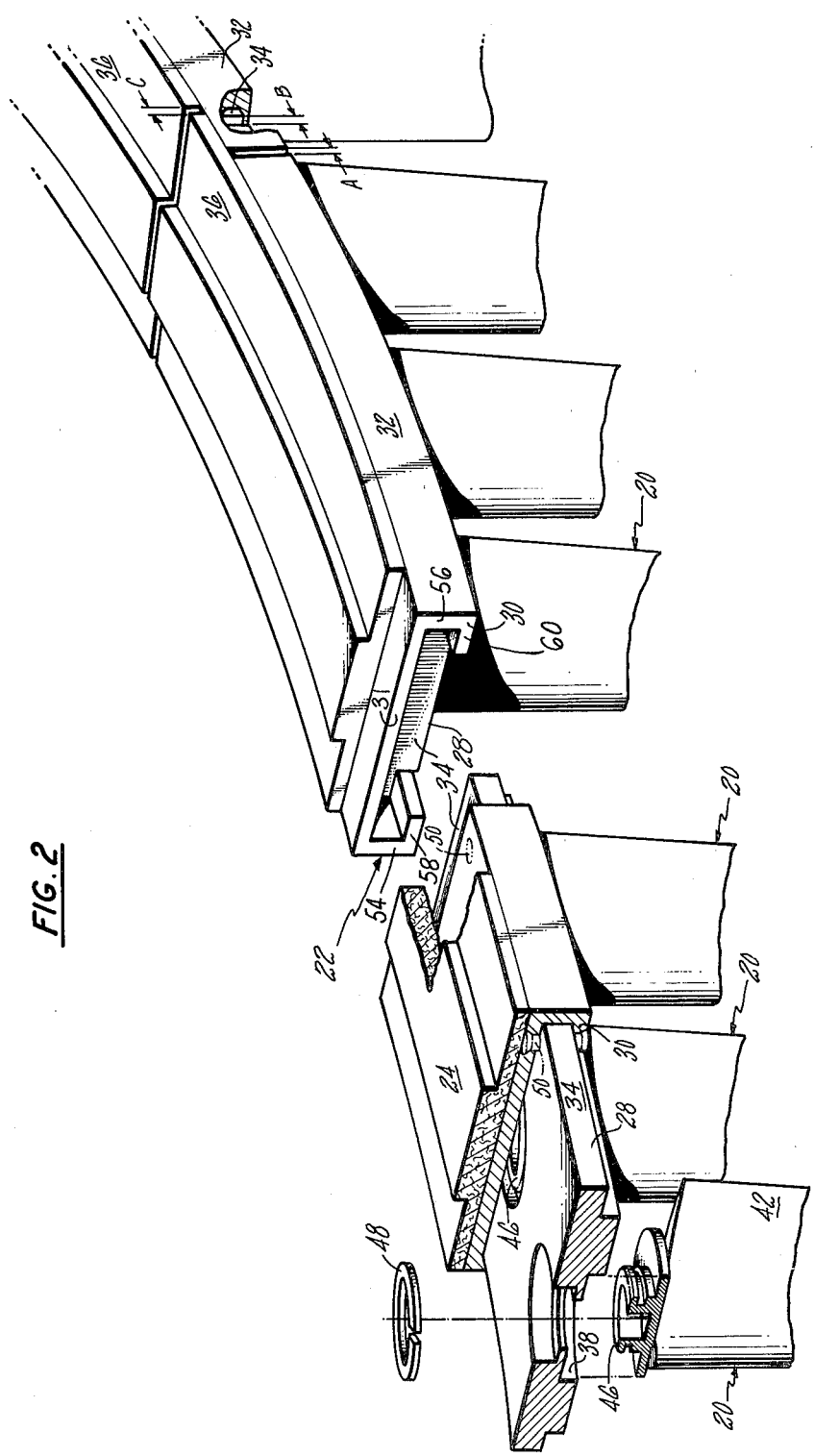
FIG. 2 is an exploded perspective view of the shroud ring with portions of the shroud ring broken away to show the engagement of stator vanes which are rotatable about a spanwise axis.

As shown in FIG. 2, the shroud ring 22 is formed of a first segmented ring such as outer ring 28 and a second segmented ring such as inner ring 30. A portion 31 of the inner ring, such as the inner wall, is inward of the outer ring. The inner ring is formed of a plurality of arcuate segments 32 spaced circumferentially one from another leaving a gap A therebetween. The outer ring is formed of a plurality of arcuate segments 34 spaced circumferentially one from another leaving a gap B therebetween. Each segment of the outer ring overlaps circumferentially two adjacent segments of the inner ring. Each segment of the inner ring slidably engages in the circumferential direction a corresponding segment of the outer ring. The segment of the inner ring may also slidably engage the other segment of the outer ring and does so as illustrated. In some embodiments, frictional forces are sufficient to prevent rotation between the segments of the inner ring and the segments of the outer ring. Other embodiments may require a means for preventing rotation of the segments of the inner ring with respect to segments of the outer ring such as a rivet 50 which is shown in phantom. The rivet engages the inner ring and the outer ring.

The seal member 24 has a plurality of seal segments 36 extending circumferentially. Each seal segment is integrally attached to one segment 32 of the inner ring and extends circumferentially beyond the end of the segment of the inner ring to slidably overlap the adjacent segment of the inner ring. The seal segments are spaced circumferentially one from another leaving a gap C therebetween.

Each segment 34 of the outer ring 28 is adapted by a plurality of holes 38 to receive a plurality of stator vanes 20. As will be appreciated, "plurality" is intended to embrace any number in excess of one. In the embodiment shown, each segment receives three vanes and accordingly has three holes. A flange 40 extends radially into each hole to decrease the diameter of the hole. Each vane has an airfoil section 42 and is rotatable about a spanwise axis S. A plate 44, having a cylindrical shape, is integrally attached to the end of each airfoil section. The plate is adapted to extend inwardly into a corresponding hole 38 in the outer ring and to rotatably engage the ring. The plate has a cylindrical tab 46 extending inwardly beyond the flange in the hole. Means for locking the vane in radial position with respect to the shroud, such as the clip 48 shown, engages the tab.

Each segment of the inner ring 30 has the inner wall 31 extending circumferentially about and inwardly of the corresponding segment 34 of the outer ring. The inner wall covers at least one of the holes 38 which adapt the corresponding segment 34 of the outer ring to receive the stator vanes 20. Each segment of the inner ring also has an upstream sidewall 54 and a downstream sidewall 56. The sidewalls are spaced axially and extend radially inwardly from the inner wall. An upstream outer wall 58 extends axially from the upstream sidewall and a downstream outer wall 60 extends axially from the downstream sidewall over the outer ring to house the outer ring within the inner ring.

FIG. 3 is an alternate embodiment of FIG. 2 having vanes 120 which are not rotatable about a spanwise axis. Each vane engages a shroud ring 122 carrying a seal member 124. The shroud ring is formed of a first segmented ring, such as outer ring 128, and a second segmented ring, such as inner ring 130. The inner ring extends circumferentially and is formed of a plurality of segments 132 spaced circumferentially one from another leaving a gap A therebetween. The outer ring extends circumferentially and is formed of a plurality of segments 134 spaced circumferentially one from another leaving a gap B therebetween. Each vane has an airfoil section 142 and a tab 146 extending inwardly from the airfoil section. Each segment of the outer ring is adapted to receive a plurality of vanes by holes 138 having the general shape of the tab. A plate 144 is engaged by a corresponding segment of the outer ring. The plate is integrally attached, for example by brazing, to the segment and to the airfoils of the vanes engaged by the segment. Means for preventing rotation of the segments of the inner ring with respect to segments of the outer ring, such as a lock 150, engages the first ring and the second ring. The outer ring and the inner ring are adapted by slots 152 to receive the axially extending lock.

Each segment of the inner ring 130 has the inner wall 131 extending circumferentially about and inwardly of the corresponding segment 134 of the outer ring. The inner wall covers at least one of the holes 138 which adapt the corresponding segment 134 of the outer ring to receive the stator vanes 120. Each segment of the inner ring also has an upstream sidewall 154 and a downstream sidewall 156. The sidewalls are spaced axially and extend radially inwardly from the inner wall. An upstream outer wall 158 extends axially from the upstream sidewall and a downstream outer wall 160 extends axially from the downstream sidewall over the outer ring to house the outer ring within the inner ring.

During operation of a gas turbine engine, working medium gases are flowed along the flow path 12 for working medium gases. The gases pass through the array of stator vanes 20. The stator structure 14, the rotor structure 16 and the shroud ring 22 confine the working medium gases to the flow path. In particular the shroud ring blocks the leakage of working medium gases past the inward ends of the array of stator vanes and the inner wall 31 blocks the leakage of working medium gases between the end of the stator vane and the segment of the inner ring through the hole 38. And, the knife edges 26 in cooperation with the seal member 24 block the leakage of working medium gases between the rotor structure 16 and the shroud ring to preserve the aerodynamic efficiency of the structure.

As relative movement between the stator structure 14 and the rotor structure increases the clearance gap between the knife edges 26 and the seal member 24, cooling air is flowed through the external tubes 15 to impinge on the stator structure. The cooling air removes heat from the stator structure causing the structure to contract and move inwardly. The shroud ring 22, being formed of the multiple nested segments, does not oppose radial movement of the stator structure 14. The shroud ring 22 is free-acting in the radial direction because each segment 32 of the inner ring 30 is slidable on a corresponding segment 34 of the outer ring 28. As the stator structure moves inwardly, the stator structure moves the radially free-acting shroud ring inwardly decreasing the circumferential gaps A, B and C in the shroud ring and decreasing the clearance gap between the seal member 24 and the knife edges 26. Decreasing the clearance gap decreases the aerodynamic penalty to efficiency caused by leakage of the working medium gases through the clearance gap.

The free-acting shroud ring 22 achieves a nested construction by having the outer ring 28 partially housed within the inner ring 30. The nested construction results in a shroud ring having a low radial profile as compared with shroud ring constructions which are not nested. The depth of the cavity in the rotor structure 16 is reduced. Aerodynamic losses which are directly proportional to the size of the cavity are accordingly reduced by the nested construction which reduces the size of the cavity.

The free-acting shroud ring both supports the stator vanes 20 and enables rotation of the vanes about their spanwise axis S. As the vanes rotate about their spanwise axis the cylindrical plate and the cylindrical tab rotate with respect to the corresponding segment of the outer ring to enable adjustment of the angle of attack of the working medium gases with respect to the airfoil. As the vanes rotate or remain stationary, the working medium gases exert forces on the vanes. Each segment of the outer ring engages two or more stator vanes to support the stator vanes against these forces in guided cantilever fashion. Such support increases the ability of the stator vanes to resist the forces exerted by the working medium gases without substantial deflections in the circumferential direction. The fatigue life of the stator vanes is increased. However, this support does not cause the array of stator vanes to resist the inward and outward radial movement of the stator structure 14.

In a similar fashion the shroud ring 122 shown in FIG. 3 has segments 134 of the outer ring 128 which are circumferentially slidable with respect to segments 132 of the inner ring 130. As the segments slide with respect to each other, the circumferential gap between segments on the outer ring, between segments on the inner ring and between segments of the seal member is changed to accommodate radial movement of the stator structure 114 and vanes 120 inwardly and outwardly. Because the shroud ring is free acting in the radial direction the shroud ring does not hinder inward and outward movement of the outward stator structure which positions the shroud ring through the vanes about the rotor structure.

In both the embodiment shown in FIG. 2 and the embodiment shown in FIG. 3 rotation of a segment of the second ring with respect to a corresponding segment of the first ring is prevented by the rivet shown in phantom in FIG. 2 and the axially extending lock in FIG. 3. Should there be a catastrophic rub between the rotor structure and the shroud ring, these locking means will prevent rotation of the inner ring with respect to the outer ring. As will be realized, in some designs the coefficient of friction between the inner ring and the outer ring will be sufficient to prevent such rotative movement.

Although this invention has been shown and described with respect to a preferred embodiment thereof, it should be understood by those skilled in the art that various changes and omissions in the form and detail thereof may be made therein without departing from the spirit and scope of the invention.

We claim:

1. For a gas turbine engine of the type having a stator structure outward of a flow path for working medium gases, rotor structure inward of the flow path for working medium gases and an array of stator vanes extending inwardly across the flow path from the outward stator structure into proximity with the inward rotor structure, an improved shroud ring for supporting the inward ends of the vanes and a seal member radially outwardly of the rotor structure, wherein the improvement comprises:
   a first ring formed of a plurality of segments extending circumferentially, each segment spaced from an adjacent segment leaving a gap therebetween and each segment engaging at least two stator vanes at the inward end of the stator vane to support the stator vanes in guided cantilever fashion, each segment being adapted by a hole at each vane to receive the vane;
   a second ring inwardly of the first ring, the second ring formed of a plurality of segments, each segment slidably engaging in the circumferential direction a corresponding segment of the first ring and each segment having an inner wall extending inwardly of the corresponding segment of the first ring to cover at least one of said holes in the corresponding segment which adapt said corresponding segment of the first ring to receive the stator vanes for blocking the leakage of working medium gases between the vanes and the first ring;
   wherein the sliding engagement between the first ring and the second ring enables the stator structure to position the second ring radially about the rotor structure in response to inward and outward movement of the stator structure.

2. The shroud ring according to claim 1 wherein the seal member is formed of a plurality of circumferentially extending seal segments, and each segment is integrally attached to the corresponding segment of the second ring and each seal segment extends circumferentially beyond the end of the corresponding segment of the second ring.

3. The shroud ring according to claim 1 wherein the corresponding segment of the first ring is adapted to receive a plurality of vanes, each vane being rotatable about a spanwise axis with respect to the corresponding segment.

4. The assembly according to claim 1 wherein each vane has an airfoil, and wherein a plurality of plates are outward of the first ring such that a plate at each segment of the first ring engages the segment of the first ring and is integrally attached to the airfoil of at least one of the vanes engaged by the segment of the first ring.

5. The assembly according to claim 4 wherein each vane engaged by the segment of the first ring has an inwardly extending tab integrally attached to the segment of the first ring and wherein the plate engaged by the segment of the first ring is integrally attached to the segment of the first ring and the vanes engaged by the segment of the the first ring.

6. The assembly according to claim 4 wherein the plate is attached to a single vane, the plate is cylindrical and has a cylindrical tab extending inwardly adapted to receive a means for locking the vane in radial position with respect to the outer ring and wherein the segment of the ring is adapted to receive the cylindrical plate and the cylindrical tab and wherein a means for locking the vane in radial position with respect to the outer ring engages the cylindrical tab.

7. The assembly according to claim 6 wherein the vane has a spanwise axis and is rotatable about said axis.

8. The assembly according to claims 1, 2, 3, 4, 5, 6, or 7 wherein each segment of the second ring overlaps circumferentially a first segment of the first ring which is said corresponding segment and overlaps circumferentially a second segment of the first ring wherein the assembly further has a means for preventing circumferential movement of a segment of the second ring with respect to an adjacent second segment of the first ring and wherein said means engages the first ring and the second ring.

9. For a gas turbine engine of the type having a stator structure outward of a flow path for working medium gases, rotor structure inward of the flow path for working medium gases and an array of stator vanes extending inwardly across the flow path from the outward stator structure into proximity with the inward rotor structure, an improved shroud ring and vane assembly for supporting the inward ends of the vanes and a seal member radially outwardly of the rotor structure, wherein the improvement comprises:

a first ring formed of a plurality of segments extending circumferentially, each segment spaced from an adjacent segment leaving a gap therebetween and each segment adapted to engage at least two stator vanes at the inward end of the stator vane to support the stator vanes in guided cantilever fashion, each segment being adapted by a hole at each vane to receive a second ring inwardly of the first ring, the second ring being formed of a plurality of segments, each segment slidably engaging in the circumferential direction a corresponding segment of the first ring and each segment having an inner wall extending inwardly of the corresponding segment of the first ring to cover at least one of said holes in the corresponding segment which adapt said corresponding segment of the first ring to receive the stator vanes for blocking the leakage of working medium gases between the vanes and the first ring;

wherein the sliding engagement between the first ring and the second ring adapts the stator structure to position the second ring radially about the rotor structure in response to inward and outward movement of the stator structure.

10. The shroud ring according to claim 9 wherein the seal member is formed of a plurality of circumferentially extending seal segments, and each segment is integrally attached to a corresponding segment of the second ring and each seal segment extends circumferentially beyond the end of the corresponding segment of the second ring.

11. The shroud ring according to claim 10 wherein each segment of the first ring is adapted to receive a plurality of vanes each vane being rotatable about a spanwise axis with respect to the corresponding segment.

12. The assembly according to claims 9, 10 or 11 wherein each segment of the second ring overlaps circumferentially a first segment of the first ring which is said corresponding segment and overlaps circumferentially a second segment of the first ring wherein the assembly further has a means for preventing circumferential movement of a segment of the second ring with respect to an adjacent second segment of the first ring and wherein said means engages the first ring and the second ring.

13. The shroud ring according to claim 1 wherein each segment of the second ring has an upstream sidewall extending radially from the inner wall and an upstream outer wall spaced radially from the inner wall which extends axially from the upstream sidewall over the first ring and further has a downstream sidewall extending radially from the inner wall and a downstream outer wall spaced radially from the inner wall which extends axially from the downstream sidewall over the first ring.

* * * * *